United States Patent [19]

Fischer et al.

[11] 4,190,452
[45] Feb. 26, 1980

[54] NEUTRAL BRONZE GLAZINGS

[75] Inventors: Klaus Fischer, Porz, Fed. Rep. of Germany; Robert Keul, Cormeilles-en-Parisis, France

[73] Assignee: Saint-Gobain Industries, Neuilly-sur-Seine, France

[21] Appl. No.: 877,743

[22] Filed: Feb. 14, 1978

Related U.S. Application Data

[62] Division of Ser. No. 637,016, Dec. 2, 1975, Pat. No. 4,101,705.

[30] Foreign Application Priority Data

Dec. 3, 1974 [FR] France .................. 74 39459

[51] Int. Cl.$^2$ .................. C03C 3/04; C03C 3/08; C03C 3/30
[52] U.S. Cl. .................. 106/52; 156/54
[58] Field of Search .................. 106/52, 54, 48

[56] References Cited

U.S. PATENT DOCUMENTS

| | | | |
|---|---|---|---|
| 2,669,808 | 2/1954 | Duncan et al. | 106/52 |
| 2,776,217 | 1/1957 | Gott | 106/52 |
| 3,143,683 | 8/1964 | Duncan et al. | 106/52 |
| 3,723,142 | 3/1973 | Kato et al. | 106/52 |
| 4,104,076 | 8/1978 | Pons | 106/52 |

*Primary Examiner*—O. R. Vertiz
*Assistant Examiner*—Mark Bell
*Attorney, Agent, or Firm*—Pennie & Edmonds

[57] ABSTRACT

A neutral bronze sheet glass has a dominant wavelength in the vicinity of 575 nm, and a monochromatic transmittance which in the range from about 400 nm to about 550 nm is on the average from about 5% to about 50% lower than in the range from about 550 nm to about 750 nm, and possesses in thicknesses suitable for glazing a luminous transmittance above 70%.

2 Claims, 4 Drawing Figures

NEUTRAL BRONZE GLAZINGS

This is a division of application Ser. No. 637,016 filed Dec. 2, 1975, U.S. Pat. No. 4,101,705.

The present invention pertains to tinted glazings used for windows and windshields of automotive vehicles. The invention provides tinted glass which has improved properties from the point of view of physiological optics for the persons receiving light and seeing through such windows. Thus automobile windows and windshields made of the glass of the invention assure the transmission therethrough of light in the visible range essential to the needs of automobile drivers, while making it possible to distinguish easily among all colors under various conditions of light and weather. The glass of the invention has excellent anti-glare and improved visibility properties generally.

The tinted glass of the invention has at the long wavelengths of the visible spectrum, i.e. between 550 and 750 nanometers (hereinafter "nm") or milllimicrons, a higher transmittance than in the shorter wavelength portion of the visible range between 400 nm and 550 nm, the transmittance moreover declining markedly toward the ultraviolet.

Known glass of this general type for automotive vehicles, as disclosed for example in the German published patent application No. 1,134,220, possesses a high transmittance for those wavelengths in the visible range from the long wavelength end of that range down to the wavelength of maximum sensitivity of the eye. For shorter wavelengths, the transmittance diminishes according to a curve parallel to the curve of sensitivity of the eye down to a minimum transmittance located between 480 and 530 nm. At still shorter wavelengths the curve of transmittance rises until the lower limit of the visible spectrum is reached, where it has a maximum value of about 30% at 400 nm. In the range of short wavelengths of the visible spectrum the transmittance is on the average of the order of 20% only, whereas in the range of long wavelengths in the visible it is about 85%.

These known window glasses for automotive vehicles have anti-glare filtering properties. In particular, due to the greatly attenuated transmittance at the short wave end of the visible range, blue-green, blue and violet light is sufficiently absorbed so that the scattering of such light under conditions of fog and small rain drops is no longer troubling, e.g. to a driver receiving light through a windshield made of such glass. This strong absorption of the shorter waves however reduces the distinction between blue and green, so that under certain conditions, such as at dusk or in fog, these colors are insufficiently perceived, with consequent impairment of safety.

It has also been proposed, in U.S. Pat. No. 3,296,004 to provide brown or bronze colored glazing whose transmittance is continued at substantial levels down to the short wavelength end of the visible range. This glazing is intended for architectural use, and more particularly to protect the occupants of buildings from solar heat. It operates by a heavy absorption of the infrared radiation. Unfortunately this absorption is accompanied by a substantial reduction in transmittance. This can be tolerated in architectural glass where it is indeed desirable for diminishing glare in strong sunlight. In particular, the glazing of U.S. Pat. No. 3,296,004 has a total luminous transmittance no higher than 58%, and is of a brown or bronze color. Applicants have discovered that by raising this total luminous transmittance, and optionally by adjusting the quantities of coloring agents, vision through the glass is markedly improved under adverse weather conditions, e.g. at time of dusk, or in rain or fog, and color perception is also improved.

The invention provides a bronze glass whose total luminous transmittance (hereinafter designated by the symbol Y) is above 70% but whose transmittance at individual wavelengths (which may be termed monochromatic transmittance) in the visible spectrum is lower at shorter than at long wavelengths. In particular, the decrease in average transmittance from long wavelengths down to the 400 nm short wavelengths in the visible spectrum is preferably from 5% to 50%. With this preferred glass according to the invention, the transmittance over the range from 550 nm to 750 nm is preferably between 75% and 90% whereas in the range of 400 nm to 550 nm it does not exceed from 60% to 85%.

On the other hand it is desirable that the transmittance in the range of 550 nm to 580 nm be higher than in the adjacent wavelength ranges, and it is also desirable that the increase in transmittance with increase in wavelength shall begin already between 500 nm and 550 nm. This last feature improves the visibility at dusk by reason of the fact that the maximum of the spectral sensitivity curve of the human eye, at accommodation for low light levels, is substantially shifted in the direction of short wavelengths by comparison to its location at accommodation for high light levels.

The automobile glasses (especially windshields) according to the invention may be monolithic glasses which are colored in the body thereof, or they may be laminated glasses. In the case of laminated glasses it is possible to tint one or more of the layers of the laminate. It is thus possible to employ with a tinted silicate glass sheet an intermediate sheet of plastic material without color and a second sheet of silicate glass which is also clear.

Of course, the transmittance depends on the thickness of the sheets and for this reason the quantities of tinting agents to be added are chosen as functions of the transmittance desired for the thicknesses of the glasses which will be employed in the vehicles.

It has surprisingly been found, and this constitutes a characteristic feature of the invention, that glasses of neutral tint, slightly bronze in color, similar to but less strongly tinted than known architectural glass, while of reduced heat-screening properties possess substantial anti-glare properties which are desirable in windshields for vision at dusk or at nighttime in the face of the headlights of an oncoming vehicle—all of this being nevertheless accompanied by good color rendition.

The glazings of the invention possess among others the following properties:

1. Decrease in the average monochromatic transmittance from long wavelengths down to the short wavelengths in the visible spectrum by about 5% to 15% at the best straight line fit.
2. Dominant wave length $\lambda_D$: between 570 and 580 nm.
3. Colorimetric purity from 2 to 6%.
4. Total luminous transmittance Y over the visible range at least 70% in thicknesses suitable for monolithic or laminated windows.

It is advantageous to reduce as much as possible the luminous transmittance in the infrared. Hence the total solar energy transmittance (hereinafter denoted T.S.E.T.) is according to a further feature of the invention held to values below 60%.

The glazings of the invention, while substantially colorless as seen by transmitted light, show by reflected light an agreable color so as to be, when employed on vehicles, of pleasing aspect as seen from the exterior.

The physiological optical properties of windshield glass are important for the comfort of the driver of the vehicle. Tests have shown that most drivers tested observe an improved visual acuity, in that objects seen by them through the glasses of the invention are sharper. The reduction in transmittance in the short wavelengths of the visible spectrum reduces in an effective and efficient way the disturbing effects of such waves under snow and fog conditions.

Above all, there is obtained with the glasses of the invention an anti-glare property which is manifested by a shortening of the recovery time of the driver's eyes after exposure to blinding light, without change in the driver's perception of green, even at dusk or under rain or foggy conditions. In addition to these desirable physiological effects, vision through the glasses of the invention is agreeable, so that the driver's comfort and tranquility are increased whether the glasses are used in the windshield or elsewhere in the vehicle, e.g. in side glass or rear windows.

These glasses of the vehicle may be made of the glass of the invention, optionally more heavily tinted so as to improve protection against infrared, since a lower transmittance can be accepted in the side glass. For the side glass there are preferably employed glasses whose average transmittance is about 65% over the range between 400 and 500 nm and about 70% between 550 and 750 nm. As for the windshield, which must have a higher average transmittance, it is advantageous to choose a value of about 70% for the transmittance in the range of short visible waves and of about 80% for the transmittance in the longer waves in the visible region.

According to another feature of the invention the glasses thereof are characterized by the fact that for a three millimeter thickness and at normal incidence their total luminous transmittance Y is between 76% and 79.5%, their dominant wavelength $\lambda_D$ is between 574 and 580 nm, and their colorometric purity factor $P_c$ is between 2% and 5%. Experience has shown that silicate glasses having these characteristics are readily adapted to manufacture as monolithic sheets in thicknesses of from 3 to 5 millimeters for the side glass of automotive vehicles and also in thicknesses of the order of 2 to 3 millimeters for use as a tinted glass sheet in laminated windshields.

BRIEF DESCRIPTION OF THE DRAWINGS

The invention will now be described in further detail and in terms of a number of presently preferred exemplary embodiments with reference to the accompanying drawings in which.

DESCRIPTION OF PREFERRED EMBODIMENTS

Figure 1:
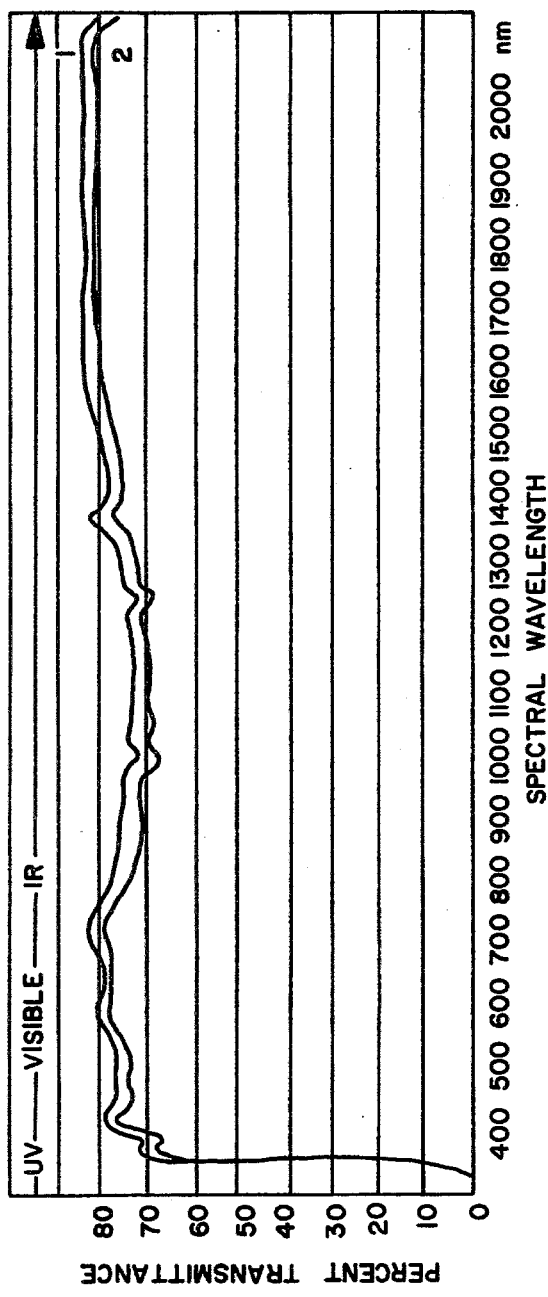
FIGS. 1, 2 and 3 are sets of graphs showing the transmittance of glazings according to the invention using glass sheets of 3 millimeters thickness.
Figure 2:
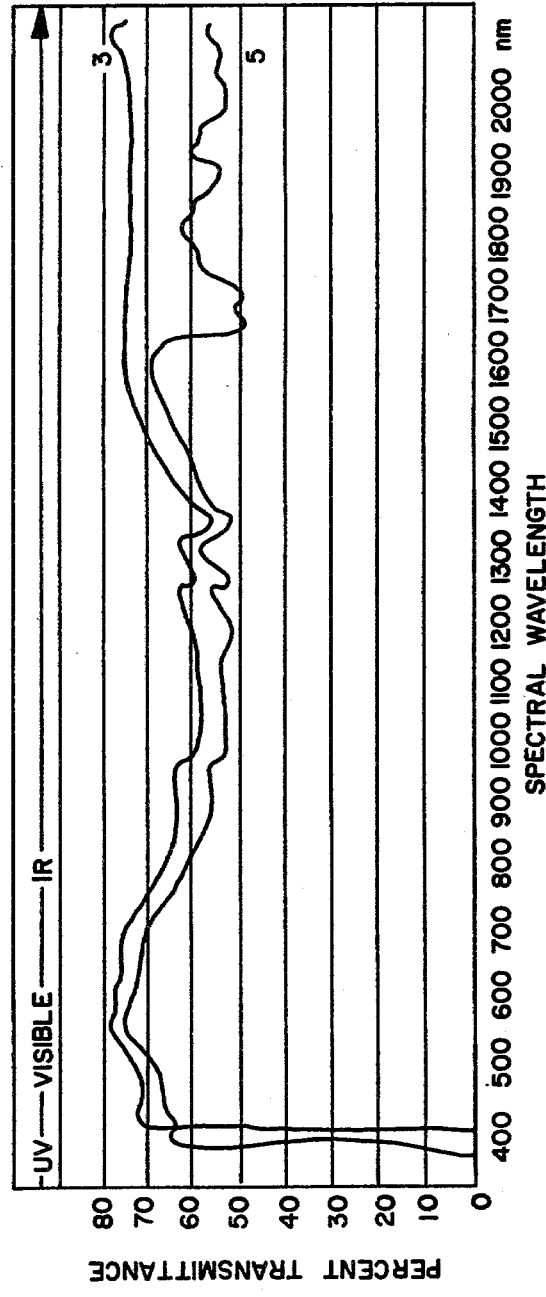
Figure 3:
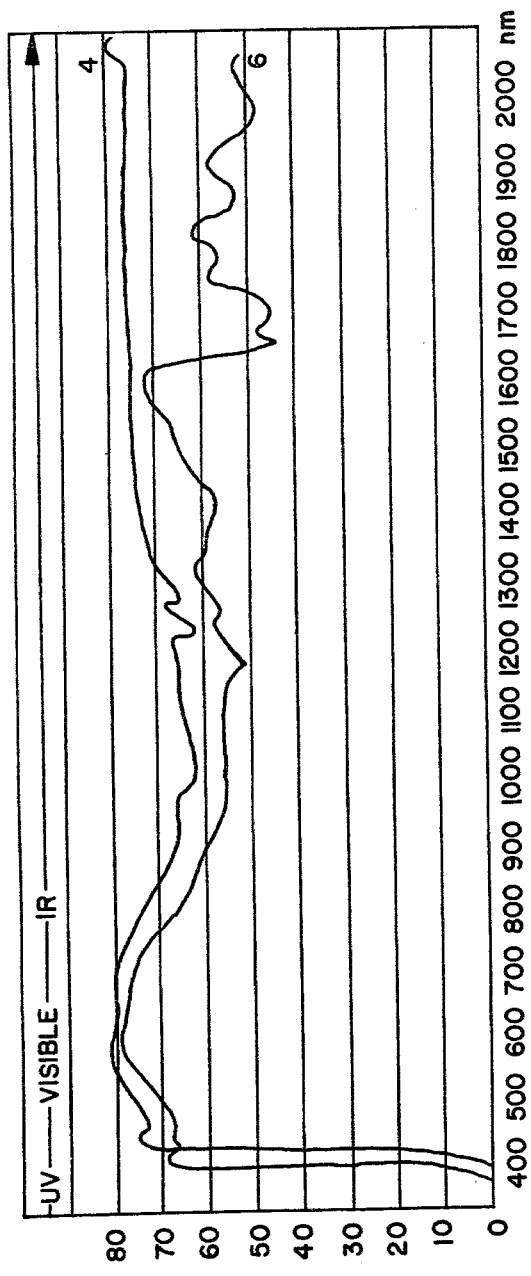

The glasses to which the curves of FIGS. 1 to 3 pertain are sodium silicon calcium glasses which are colored in the mass and to which there have been added as coloring agents small quantities of selenium and of oxides of iron, cobalt and of nickel and/or chromium, the composition of which agents is known for bronze glasses but whose coloring or tinting effect is greatly reduced in the glasses of the invention.

These transmittance characteristics being functions of the thickness of the glass traversed by the light, they are stated for a thickness of 3 millimeters. In addition, the luminous source employed for measurement is illuminant C of the C.I.E. This is, however, of secondary importance, since the transmittance curves of the glasses of the invention are relatively flat.

In the examples which will now be given, there is set forth for each glass the composition thereof, including that of coloring agents therein, and the following optical properties for illuminant C:

total luminous transmittance Y
trichromatic coordinates x and y
dominant wavelength $\lambda_D$
colorimetric purity $P_c$
total solar energy transmittance T.S.E.T.

EXAMPLE I

To make 100 Kg. of the glass of this example, the following vitrifiable mixture or batch was employed:

| Ingredient | Weight in Kg. |
| --- | --- |
| Nepheline syenite | 1.41 |
| Dolomite | 23.29 |
| Limestone | 1.77 |
| Sand | 71.03 |
| Sodium sulfate, 99.5% pure | 1.20 |
| Sodium carbonate | 22.88 |
| Iron putty (a mixture of $Fe_2O_3$ and boiled linseed oil) | 0.2230 |
| Selenium | 0.0140 |
| Cobalt oxide | 0.0024 |

The calculated composition in weight percents, of this batch was as follows:

| | |
| --- | --- |
| $SiO_2$ | 71.60 |
| $Al_2O_3$ | 0.40 |
| CaO | 9.40 |
| MgO | 4.00 |
| $Na_2O$ | 14.00 |
| $K_2O$ | 0.12 |
| $SO_3$ | 0.68 |
| $Fe_2O_3$ | 0.2366 |
| Se | 0.0140 |
| CoO | 0.0022 |

On remelting or refining of a tinted glass, certain constituents thereof are lost in whole or in part, in particular certain of the coloring agents. Consequently, the glass of Example I was separately analyzed for the coloring agents, with the following results in weight percents of the glass:

| | |
| --- | --- |
| Total iron, expressed as $Fe_2O_3$ | 0.23 |
| Selenium | 0.0024 |

-continued

| | |
|---|---|
| CoO | 0.0019 |

Investigation of the glass of Example I for optical properties yielded the following results:

| | |
|---|---|
| Y | 78.7% |
| x | 0.3136 |
| y | 0.3192 |
| λD | 579 nm |
| $P_c$ | 2.00% |
| T.S.E.T. | 77.6% |

The transmittance curve of the glass of Example I is the curve 1 of FIG. 1.

EXAMPLE II

In this example there was used the same vitrifiable mixture as in Example I, with the difference that in order to reduce the transmittance in the infrared there was employed a slightly larger quantity of iron putty, calculated as 0.2933% $Fe_2O_3$ by weight (0.2816 Kg. of iron putty per 100 Kg. of vitrifiable mixture) in place of 0.2366% $Fe_2O_3$.

The analysis of the resulting glass for coloring agents yielded the following results in weight percents:

| | |
|---|---|
| Total iron, as $Fe_2O_3$ | 0.28 |
| Selenium | 0.0023 |
| CoO | 0.0010 |

The optical characteristics of this glass were as follows:

| | |
|---|---|
| Y | 77.5% |
| x | 0.3144 |
| y | 0.3201 |
| λD | 578 nm |
| $P_c$ | 2.00% |
| T.S.E.T. | 75.2% |

The spectral transmittance curve of the glass of Example II is the curve 2 of G. 1.

EXAMPLE III

To make 100 Kg., more or less of the glass of this example, there was employed the following vitrifiable batch mixture:

| Ingredient | Weight in Kg. |
|---|---|
| Nepheline syenite | 1.41 |
| Dolomite | 23.39 |
| Limestone | 1.77 |
| Sand | 70.97 |
| Sodium sulfate, 99.5% pure | 0.88 |
| Sodium carbonate | 22.86 |
| Sodium nitrate | 0.40 |
| Iron putty | 0.3192 |
| Selenium | 0.0105 |
| Cobalt oxide | 0.00145 |

The calculated composition of this batch in weight percents was as follows:

| | |
|---|---|
| $SiO_2$ | 71.60 |
| $Al_2O_3$ | 0.40 |
| CaO | 9.40 |
| MgO | 4.00 |
| $Na_2O$ | 14 |
| $K_2O$ | 0.12 |
| $SO_3$ | 0.50 |
| $Fe_2O_3$ | 0.40 |
| Se | 0.0105 |
| CoO | 0.00132 |

Analysis of the glass for coloring agents, done by X-ray fluorescence, yielded the following results, again in weight percents of the glass:

| | |
|---|---|
| Total iron as $Fe_2O_3$ | 0.398 |
| Selenium | 0.00112 |
| CoO | 0.00147 |

Analysis of the glass of Example III for optical properties yielded the following results:

| | |
|---|---|
| Y | 77.7% |
| x | 0.3161 |
| y | 0.3239 |
| λD | 574 nm |
| $P_c$ | 3.7% |
| T.S.E.T. | 70.9% |

The transmittance curve for this glass is the curve 3 in FIG. 2. It will be seen, by comparison with the curves of FIG. 1, that this glass has distinctly poorer transmittance in the ultra-violet, and this is due to the higher proportion of ferric oxide in Example III.

EXAMPLE IV

The starting mixture for the manufacture of this glass was similar to that employed in the manufacture of the glasses of Examples I and II, the calculated composition thereof being the following, in weight percents:

| | |
|---|---|
| $SiO_2$ | 70.91 |
| $Al_2O_3$ | 1.16 |
| CaO | 9.25 |
| MgO | 4.32 |
| $Na_2O$ | 13.65 |
| $K_2O$ | 0.56 |

For coloring agents this glass included selenium, cobalt oxide, and a small amount of nickel oxide in addition to ferric oxide. Analysis of the glass for coloring agents gave the following results, in weight percents of the glass:

| | |
|---|---|
| Total iron expressed as $Fe_2O_3$ | 0.38 |
| Selenium | 0.0007 |
| CoO | 0.0014 |
| NiO | 0.0023 |

An examination of the glass for optical properties gave the following data:

| | |
|---|---|
| Y | 78.7% |
| x | 0.3168 |
| y | 0.3245 |
| λD | 575 nm |
| $P_c$ | 4% |

-continued

| | |
|---|---|
| T.S.E.T. | 72.3% |

The transmittance curve of the glass of Example IV is the curve 4 of FIG. 3 and is very similar to the corresponding curve 3 of FIG. 2 for Example III.

The glasses of the two following examples V and VI are particularly desirable for use in laminated windshields when such glass is employed as the tinted glass sheet.

EXAMPLE V

A laminated windshield was manufactured by combining a 3 millimeters thick sheet of glass according to Example III with a sheet of clear glass 3 millimeters in thickness, with an intercalated sheet of polyvinyl butyral 0.76 millimeters thick. After the three layers had been adhered together the total thickness of the laminated windshield was 6.40 millimeters. The optical characteristics of this glass were as follows:

| | |
|---|---|
| Y | 74.8% |
| x | 0.3170 |
| y | 0.3266 |
| $\lambda D$ | 572 nm |
| $P_c$ | 4.6% |
| T.S.E.T. | 64.3% |

The transmittance curve of this laminated windshield is the curve 5 in FIG. 2, which is comparable to the curve 3 of FIG. 2.

EXAMPLE VI

A laminated windshield was manufactured by combining a 3 millimeters thick sheet of glass according to Example IV with a sheet of clear glass, again 3 millimeters thick, and with an intercalated sheet of polyvinylbutyral 0.76 millimeters thick.

After assembly of the three sheets together by means of an adhesive, the total thickness of the laminated windshield was 6.52 millimeters. Its optical characteristics were the following:

| | |
|---|---|
| Y | 75.8% |
| x | 0.3183 |
| y | 0.3276 |
| $\lambda D$ | 573 nm |
| $P_c$ | 5.3% |
| T.S.E.T. | 65.3% |

The curve 6 of FIG. 3 gives the transmittance curve for this glass.

EXAMPLE VII

Figure 4:
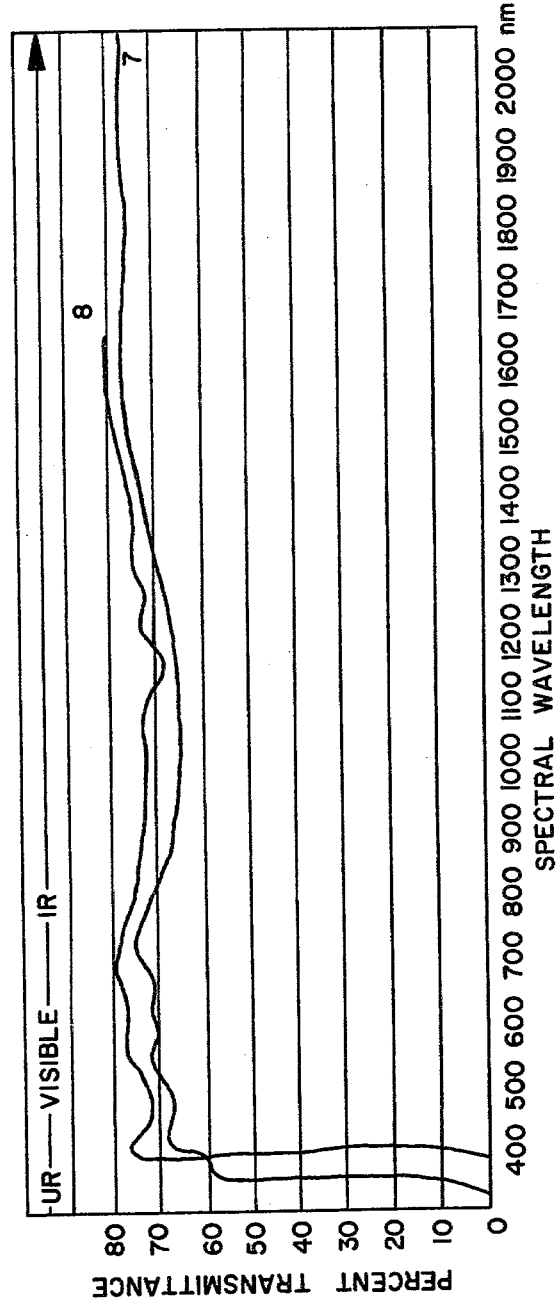
FIG. 4 is a set of graphs showing the transmittance of two further window materials according to the invention.

A glass sheet 4.8 mm. thick, of tempered silica-soda-lime glass having the following composition by weight:
 SiO$_2$: 71.12
 SO$_3$: 0.30
 Al$_2$O$_3$: 0.34
 Na$_2$O: 14.36
 K$_2$O: 0.048
 CaO: 9.76
 MgO: 3.91
and including as part of that composition, by weight, coloring agents as follows:
 Fe$_2$O$_3$: 0.20
 CoO: 0.0024
 Se: 0.0024
 Cr$_2$O$_3$: 0.0019
and also
 TiO$_2$: 0.0470
exhibited the transmittance shown at curve 7 in FIG. 4. The total luminous transmittance was 71%. The average transmittance over that portion of the visible spectrum below 550 nm was 67% and the average transmittance over that portion of the visible range above 550 nm was 73%. The transmittance in the infrared was from 65% to 80%. In the ultraviolet the transmittance fell off rapidly for wavelengths shorter than 400 nm. Sheet glass according to this example is well suited to use in the side glass and rear windows of automobiles.

To summarize the coloring agents may be:

| | | |
|---|---|---|
| Fe$_2$O$_3$ 0.2 to 0.5% | Se 0.0025 to 0.0005% | |
| CoO 0.0050 to 0% | NiO 0 to 0.0025% | Cr$_2$O$_3$ 0 to 0.0020% | in sufficiently low amounts so as to obtain the desired transmittance properties.

EXAMPLE VIII

A laminated window material according to the invention comprised a sheet of the glass of Example VII together with a thin layer of plastic and a second layer of clear glass of the same composition as the glass of Example VII but without coloring agents. The transmittance of the material is given by the curve 8 in FIG. 4. The total luminous transmittance of the laminated material in the visible spectrum was 75.5%. Over that portion of the visible spectrum below, i.e. shorter than, 550 nm the average transmittance was 73% whereas for the longer wavelengths of the visible spectrum it was about 77%. The mean transmittance in the infrared was about 78%.

While the invention has been described hereinabove in terms of a number of presently preferred embodiments thereof, the invention itself is not limited thereto but rather comprehends all modifications of and departures from these embodiments presently falling within the spirit and scope of the appended claims.

We claim:
1. A neutral bronze glass consisting essentially of the following ingredients in percentage by weight:
 SiO$_2$: 60 to 75%
 B$_2$O$_3$: 0 to 7%
 Al$_2$O$_3$: 0 to 5%
 Na$_2$O: 10 to 20%
 K$_2$O: 0 to 10%
 CaO: 0 to 16%
 MgO: 0 to 10%
 Fe$_2$O$_3$: 0.20 to 0.5%
 CoO: 0.0025 to 0%
 Se: 0.0025 to 0.0005%
said glass having at a thickness of 3 mm over the range of wavelengths from 400 to 750 nm a luminous transmittance above 70%, an excitation purity between 2% and 6%, a monochromatic transmittance to which the best straight line fit has at 400 nm a value between 5% and 15% lower than its value at 750 nm, and a dominant wavelength between 570–580 nanometers.

2. A neutral bronze glass according to claim 1 further containing:
 NiO: 0 to 0.0025%
 Cr$_2$O$_3$: 0.0050 to 0%.

* * * * *